United States Patent
Itatani et al.

(10) Patent No.: US 9,884,368 B2
(45) Date of Patent: Feb. 6, 2018

(54) APPLICATOR FOR GRAIN BOUNDARY DIFFUSION PROCESS

(75) Inventors: Osamu Itatani, Kyoto (JP); Masato Sagawa, Kyoto (JP)

(73) Assignee: INTERMETALLICS CO., LTD., Nakatsugawa-shi (JP)

(*) Notice: Subject to any disclaimer, the term of this patent is extended or adjusted under 35 U.S.C. 154(b) by 456 days.

(21) Appl. No.: 13/643,215

(22) PCT Filed: Apr. 26, 2011

(86) PCT No.: PCT/JP2011/060169
§ 371 (c)(1),
(2), (4) Date: Oct. 24, 2012

(87) PCT Pub. No.: WO2011/136223
PCT Pub. Date: Nov. 3, 2011

(65) Prior Publication Data
US 2013/0040050 A1   Feb. 14, 2013

(30) Foreign Application Priority Data
Apr. 27, 2010   (JP) ................. 2010-101787

(51) Int. Cl.
*H01F 1/01*   (2006.01)
*B22F 3/24*   (2006.01)
(Continued)

(52) U.S. Cl.
CPC .............. *B22F 3/24* (2013.01); *B22F 7/04* (2013.01); *B41F 15/0881* (2013.01);
(Continued)

(58) Field of Classification Search
CPC .......... H01F 7/02; H01F 1/053; H01F 1/0536; H01F 7/0236; H01F 1/0235; H01F 1/0236
(Continued)

(56) References Cited

U.S. PATENT DOCUMENTS 5,682,670 A * 11/1997 Bell ................. H01F 41/0253
                                                      156/222
2002/0157733 A1* 10/2002 Sellers ................. B22F 3/225
                                                      148/104
(Continued)

FOREIGN PATENT DOCUMENTS

CN   1898757 A    1/2007
CN   101076870 A  11/2007
(Continued)

OTHER PUBLICATIONS

Apr. 1, 2014 Office Action issued in Chinese Patent Application No. 201180020502.5 (with translation).
(Continued)

*Primary Examiner* — Tabassom Tadayyon Eslami
(74) *Attorney, Agent, or Firm* — Oliff PLC (57) ABSTRACT

An applicator for grain boundary diffusion process that uniformly applies an RH powder without excess or deficiency onto a predetermined surface of a sintered compact with a given thickness and in a given pattern, the applicator being automated and performed on many sintered compacts during the production of a NdFeB system sintered magnet. The applicator includes a work loader and a print head, located above the work loader. The work loader includes: a laterally movable base; a lift being vertically movable with respect to the base; a frame that is attachable to and detachable from the lift; a tray that is attachable to and detachable from the frame; a supporter provided on the upper surface of the tray; and a vertically movable magnetic clamp. The print head includes: a screen having a passage section; and a movable squeegee and a backward scraper that maintains contact with the upper screen surface.

8 Claims, 5 Drawing Sheets

(51) Int. Cl.
*H01F 41/02* (2006.01)
*C23C 10/28* (2006.01)
*B22F 7/04* (2006.01)
*C22C 33/02* (2006.01)
*B41F 15/08* (2006.01)
*B41F 15/26* (2006.01)
*B41F 15/36* (2006.01)
*B41F 15/46* (2006.01)
*B22F 3/00* (2006.01)
*H01F 1/057* (2006.01)

(52) U.S. Cl.
CPC ............ *B41F 15/26* (2013.01); *B41F 15/36* (2013.01); *B41F 15/46* (2013.01); *C22C 33/0278* (2013.01); *C23C 10/28* (2013.01); *H01F 41/0293* (2013.01); *B22F 3/008* (2013.01); *H01F 1/0577* (2013.01)

(58) Field of Classification Search
USPC ......... 428/822.3, 882.3; 427/822.5; 118/500, 118/728; 269/54.5, 38, 54.3, 24, 48.2
See application file for complete search history.

(56) References Cited

U.S. PATENT DOCUMENTS

| | | | |
|---|---|---|---|
| 2003/0029570 A1* | 2/2003 | Kawamura et al. | 156/345.51 |
| 2004/0265493 A1* | 12/2004 | Mizuno et al. | 427/335 |
| 2008/0006345 A1 | 1/2008 | Machida et al. | |
| 2008/0054738 A1* | 3/2008 | Komuro | B82Y 10/00 310/46 |
| 2008/0286595 A1* | 11/2008 | Yoshimura | B22F 7/062 428/548 |
| 2009/0297699 A1* | 12/2009 | Baba et al. | 427/127 |
| 2010/0007232 A1 | 1/2010 | Komuro et al. | |
| 2010/0109468 A1* | 5/2010 | Natsumeda et al. | 310/156.43 |
| 2012/0055355 A1* | 3/2012 | Li | B41F 15/0818 101/123 |
| 2012/0114844 A1* | 5/2012 | Odaka | B22F 3/24 427/127 |

FOREIGN PATENT DOCUMENTS

| | | |
|---|---|---|
| CN | 101145424 A | 3/2008 |
| CN | 101479109 A | 7/2009 |
| EP | 1 843 360 A1 | 10/2007 |
| EP | 2033781 A1 | 3/2009 |
| JP | A-63-252405 | 10/1988 |
| JP | 2000-025319 A | 1/2000 |
| JP | 2004-291366 A | 10/2004 |
| JP | A-2006-019521 | 1/2006 |
| JP | 2007-21394 * | 2/2007 |
| JP | A-2008-061333 | 3/2008 |
| JP | A-2009-170541 | 7/2009 |
| JP | 2009-188174 * | 8/2009 |
| JP | A-2010-098115 | 4/2010 |
| KR | 10-2007-0074593 A | 7/2007 |
| WO | WO 2006/043348 A1 | 4/2006 |
| WO | WO 2006/064848 A1 | 6/2006 |
| WO | WO2008/123251 * | 10/2008 |

OTHER PUBLICATIONS

International Search Report issued in International Application No. PCT/JP2011/060169 dated Aug. 9, 2011 (with translation).
Written Opinion issued in International Application No. PCT/JP2011/060169 dated Aug. 9, 2011 (with translation).
May 25, 2016 Search Report issued in European Patent Application No. 11775004.2.
Mar. 8, 2017 Office Action issued in European Patent Application No. 11775004.2.

* cited by examiner

APPLICATOR FOR GRAIN BOUNDARY DIFFUSION PROCESS

TECHNICAL FIELD

The present invention relates to an applicator for applying a powder of $R_H$ (Dy and/or Tb) or that of a compound of $R_H$ to a sintered compact when performing a grain boundary diffusion process in the production of a NdFeB (neodymium, iron, and boron) system sintered magnet.

BACKGROUND ART

NdFeB (neodymium, iron, and boron) system sintered magnets were discovered in 1982 by Sagawa, one of the inventors of this invention, and other researchers. NdFeB system sintered magnets exhibit characteristics far better than those of conventional permanent magnets, and can be advantageously manufactured from raw materials such as Nd (a kind of rare earth element), iron, and boron, which are relatively abundant and inexpensive. Hence, NdFeB system sintered magnets are used in a variety of products, such as voice coil motors used in hard disks and other apparatus, driving motors for hybrid or electric cars, battery-assisted bicycle motors, industrial motors, high-grade speakers, headphones, and permanent magnetic resonance imaging systems.

In recent years, there has been increased anticipation for a thin (in the direction of the magnetization) NdFeB system sintered magnet which can be used at ambient temperatures of 100° C. or more. Such a magnet will mainly be used in the automobile industry, which is rapidly taking on environmental and other issues. However, NdFeB system sintered magnets have a problem in that their magnetic properties significantly deteriorate as the temperature increases, and therefore an irreversible demagnetization is likely to occur at ambient temperatures of 100° C. or more. A NdFeB system sintered magnet with a coercive force $H_{cJ}$ (the measured value of the magnetic field H when the magnetization intensity J is 0 as a result of decreasing the magnetic field H on the magnetization curve) equal to or greater than a pre-defined value (e.g. 15 kOe≈1.2 MA/m) must be manufactured to solve this problem. A magnet having a high coercive force is less likely to be demagnetized, which decreases the likelihood of irreversible demagnetization.

One way to increase the coercive force of a NdFeB system sintered magnet is to substitute $R_H$ for a portion of Nd (substitution method). Although it can increase the coercive force, the disadvantage of this method is that the residual flux density and the maximum energy product are decreased.

Patent Document 1 discloses a method for manufacturing a NdFeB system sintered magnet using a grain boundary diffusion method. In this method, the crystal axis of each grain in a NdFeB system alloy powder is oriented in a predetermined direction. The NdFeB system alloy powder is then sintered at a predetermined sintering temperature to prepare a sintered compact, to the surface of which is applied a powder of $R_H$ or a powder of a compound of $R_H$ (which will hereinafter be referred to as an "$R_H$ powder"), and the sintered body is heated to the temperature at which $R_H$ diffuses. Naturally, this diffusion temperature is lower than the sintering temperature. As a consequence, $R_H$ penetrates into the sintered compact through the grain boundaries of the $Nd_2Fe_{14}B$ crystal grains which exist in the sintered compact, so that $R_H$ is diffused on the surface of the crystal grains. It is possible to obtain a high coercive force and suppress the reduction in residual flux density and maximum energy product using the grain boundary diffusion method. In addition, the manufacturing cost of a sintered magnet decreases because $R_H$, which is rare metal, is used less in this method than in the substitution method.

BACKGROUND ART DOCUMENT

Patent Document

[Patent Document 1] WO-A1 2006/043348
[Patent Document 2] JP-A 2008-061333
[Patent Document 3] JP-A 2009-170541

DISCLOSURE OF THE INVENTION

Problem to be Solved by the Invention

As previously described, Dy and Tb are rare metals, which are limited in supply and expensive. Therefore, the amount of an $R_H$ powder applied to a sintered compact should be minimized when performing the grain boundary diffusion method. For example, Patent Document 2 discloses that, when manufacturing a NdFeB system sintered magnet to be used in a rotating machine such as a motor or a power generator, using the grain boundary diffusion method, an $R_H$ powder is applied to only to a portion of a sintered compact of the magnet for the purpose of increasing the coercive force locally in essential areas only.

In a rotating machine using a permanent magnet, a coil and the permanent magnet face each other. When a magnetic field is generated by the coil in the direction opposite to that of the magnetization of the permanent magnet, the shaft rotates. A permanent magnet used in a motor usually has thickness curved (changing) with respect to the direction of magnetization. In such a permanent magnet, the thin portion is easily demagnetized when a magnetic field is applied in the direction opposite to that of the magnetization, which decreases the driving torque.

Patent Document 2 discloses that, in making a NdFeB system sintered magnet, the coercive force of the thin portion of the manufactured sintered compact is partially increased by applying an $R_H$ powder and using the grain boundary diffusion method, in order to balance the demagnetization of the whole area. Designing the application pattern (or changing the application amount) of the $R_H$ powder depending on the use and the shape of the magnet as in the method of Patent Document 2 is advantageous in that the amount of Dy and Tb used can be decreased and therefore the cost can be reduced.

It is important in applying $R_H$ powder to apply evenly and only the amount required to decrease the amount of Dy and Tb used. It is also industrially required that multiple sintered compacts can be simultaneous applied, and an automated application can be facilitated.

As a method for applying an $R_H$ powder onto the surface of a sintered compact when performing a grain boundary diffusion method, Patent Documents 1 and 2 disclose an immersion method whereby a sintered compact is immersed in a slurry in which an $R_H$ powder is suspended in water or in an organic solvent, and a spray method in which a slurry is sprayed on the sintered compact.

However, with the immersion method, it is difficult to control the applying amount of the $R_H$ powder and uniformly apply it. While it is relatively easy to control the applying amount of $R_H$ powder in the spray method, the $R_H$ powder disperses not only towards the application target, i.e. the sintered compact, but also in other directions, disadvantageously decreasing the yield. Further, with these methods, it is difficult to simultaneously apply an $R_H$ powder to multiple sintered compacts in a predetermined pattern.

Patent Document 3 discloses the use of the barrel painting method as an application method when performing a grain boundary diffusion process. In the barrel painting method, adhesive-layer coated medium bodies, onto which an adhesive substance has been coated, are collided with a target body (a "sintered compact" in this case) to form an adhesive layer on the surface of the target body. After the adhesive layer has been formed, the target body is then collided with powder-coated medium bodies, onto which a powder (an "$R_H$ powder" in this case) has been applied, to form a powder coating on the target body.

With the barrel panting method, it is possible to form a uniform powder layer on the whole surface of a sintered compact without dispersing the $R_H$ powder. However, it is difficult to apply the $R_H$ powder on a predetermined surface of a sintered compact with a given thickness or in a certain pattern using this method.

The problem to be solved by the present invention is to provide an applicator for grain boundary diffusion process capable of, when performing a process using the grain boundary diffusion method to make a NdFeB system sintered magnet, uniformly applying an $R_H$ powder in proper quantities onto a predetermined surface of a sintered compact with a given thickness and in a given pattern, the applicator also being easily automated and being capable of performing an application operation on multiple sintered compacts.

Means for Solving the Problem

To solve the aforementioned problem, the present invention provides an applicator for grain boundary diffusion process for applying a coating material, which is a slurry of a powder of $R_H$ (Dy and/or Tb) or a slurry of a powder of a compound of $R_H$, to a surface of a sintered compact of a NdFeB system alloy powder, including:

a) a sintered compact holder for holding the sintered compact;

b) a screen having a passage section which allows the coating material to pass therethrough and which has a pattern corresponding to a pattern of the coating material to be applied to the surface of the sintered compact;

c) a moving unit for moving the sintered compact holder and/or the screen so as to bring into contact with each other the sintered compact being held by the sintered compact holder and the screen, and to separate the sintered compact and the screen when they are in contact with each other; and d) a coating material supplier for supplying the coating material to the surface of the sintered compact through the passage section while the sintered compact and the screen are in contact with each other.

Effects of the Invention

The method using the aforementioned screen (which will be hereinafter called the "screen method") is suitable for the application of an $R_H$ powder when performing the grain boundary diffusion process in the following respects.

Even when multiple sintered compacts are to be treated, it is possible to simultaneously apply the $R_H$ powder simply by aligning them under the screen.

The $R_H$ powder can be uniformly applied onto a predetermined surface of a sintered compact. Its thickness (i.e. the used amount of $R_H$ powder) can be adjusted by repeating the application process multiple times.

Even when the $R_H$ powder is to be applied to a predetermined area of a sintered compact in a predetermined pattern, it is only necessary to provide the passage section on the screen in accord with the pattern. Further, the same screen can be reused.

When the $R_H$ powder is to be applied to two opposite main surfaces of a sintered compact, it only needs to be applied with a predetermined thickness to one main surface facing the screen. The process can then be repeated with the other main surface facing the screen.

It can be easily automated.

The screen method is an advantageous application method both in terms of reducing the amount of $R_H$ powder used and in terms of industrial aspects, such as mass production and automation. Therefore, the use of the applicator according to the present invention realizes a production of highly coercive NdFeB system sintered magnet without using an excessive amount of $R_H$ powder, which is rare and expensive.

BEST MODES FOR CARRYING OUT THE INVENTION

Embodiments of the two-dimensional photonic crystal laser according to the present invention will be described with reference to FIGS. 1 through 7.

Embodiment

Figure 1:
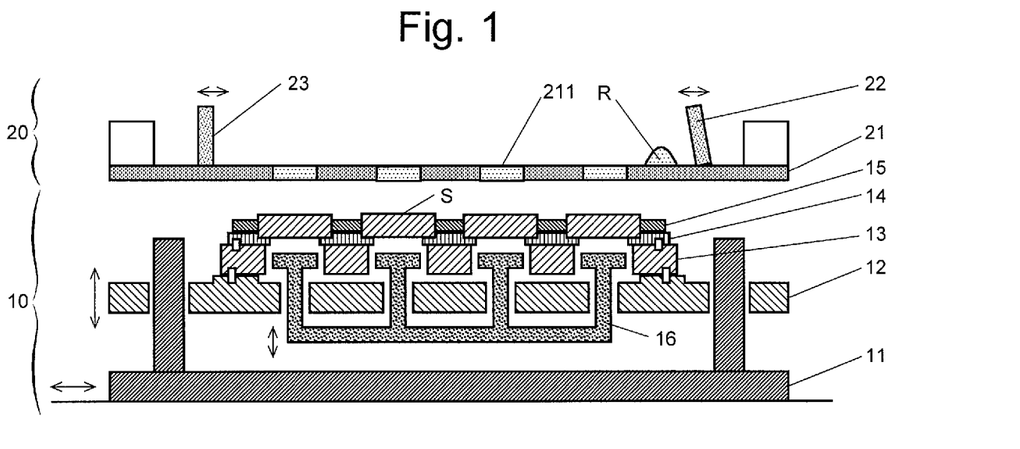
FIG. 1 is a schematic vertical sectional view showing an embodiment of the applicator for grain boundary diffusion process according to the present invention.

The present embodiment describes an example for making a NdFeB system sintered magnet by performing the grain boundary diffusion process on a sintered compact of a NdFeB system alloy powder by using the applicator for grain boundary diffusion process as shown in FIG. 1. The method for manufacturing a sintered compact is not particularly limited in the present invention. For example, the method described in JP-A 2006-019521 may be used to manufacture a sintered compact having high magnetic properties by a near-net-shape process.

Figure 2A:
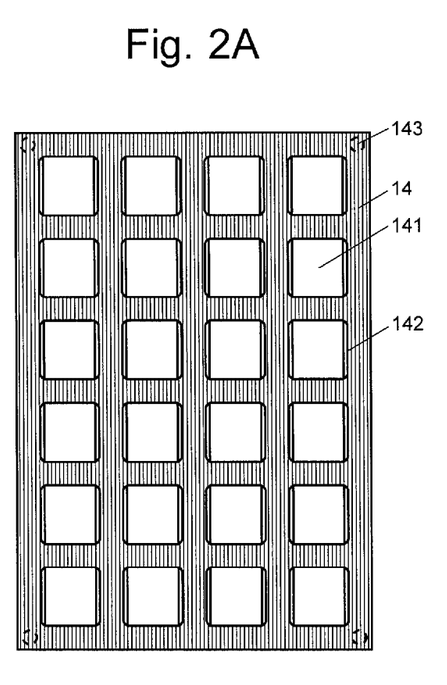
FIGS. 2A and 2B are a plain view, respectively showing an example of the tray and the frame, each of which is a part of the applicator for grain boundary diffusion process of the present embodiment.
Figure 2B:
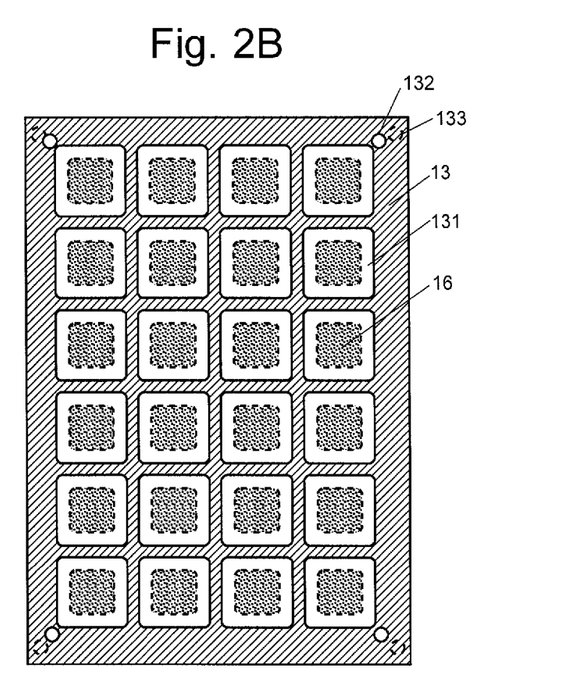

The configuration of the applicator for grain boundary diffusion process will now be described with reference to FIGS. 1, 2A and 2B. The applicator for grain boundary diffusion process is roughly composed of a work loader 10 and a print head 20, which is provided above the work loader 10. The work loader 10 includes: a base 11 which can be laterally moved; a lift 12 which can be vertically moved with respect to the base 11; a frame 13 which is placed so as to be attachable to and detachable from the lift 12; a tray 14 which is placed so as to be attachable to and detachable from the frame 13; a supporter 15 which is provided on the upper surface of the tray 14; and a magnetic clamp 16 which is vertically movable. The print head 20 includes: a screen 21; and a squeegee 22 and a backward scraper 23 which are movable while maintaining contact with the upper surface of the screen 21.

A passage section 211 is provided on the screen 21. In this embodiment, a coating material R is applied to the surface of a sintered compact S through the passage section 211. A slurry prepared by dispersing a fine powder of an oxide of $R_H$ or that of a fluoride of $R_H$ in an organic solvent may be used as the coating material R, for example.

If the screen 21 is made of polyester, the applied coating material R will have a fine finish because it easily conforms to the surface of the sintered compact S during the process of applying the coating material R to the sintered compact S. The screen 21 may otherwise be made of a stainless steel, for example, if durability is a priority.

The tray 14 and the supporter 15 are jigs for placing the sintered compact S and fixing the position thereof. As shown in FIG. 2, holes 141 (arrayed in six rows and four columns) for containing the sintered compact S are provided in the tray 14. A holding unit 142 is provided on the lower surface of the hole 141. Each sintered compact S is placed in each hole 141 from the upper surface of the tray 14 so as to be caught by the holding unit 142. The supporter 15 is placed on the tray to fix the position of the sintered compact S. The supporter 15 fills the gap between the sintered compact S and the tray 14 so that the screen 21 will not be scratched. In order not to obstruct the application of the coating material to the sintered compact 5, the thickness of the supporter 15 is set so that the upper surface thereof is slightly below (approximately 0.1 through 0.2 mm) the upper surface of the sintered compact S which is placed on the tray 14.

Figure 3A:
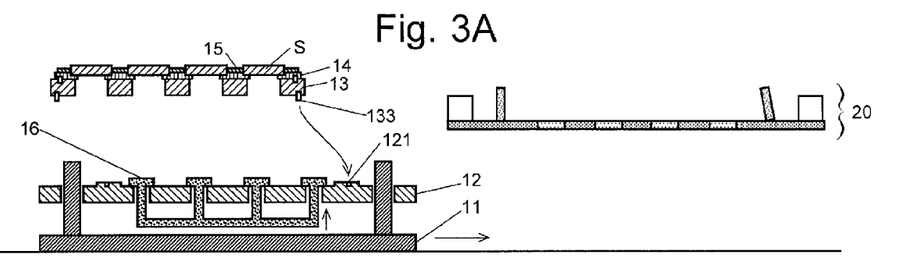
FIGS. 3A through 3E show the procedure of the application process by the applicator for grain boundary diffusion process of the present embodiment.
Figure 3B:
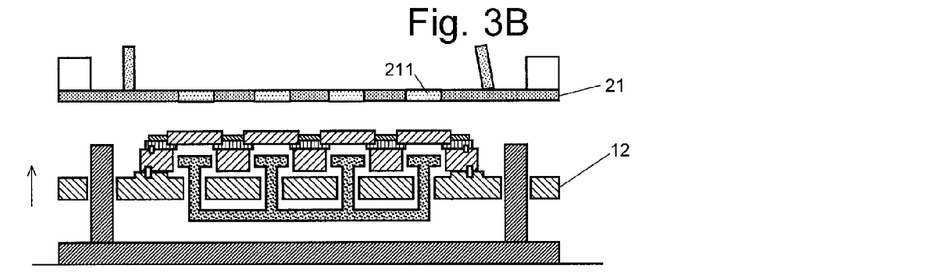

The frame 13 prevents the tray 14 from bending. Openings 131 are provided in the frame 13 in positions corresponding to the holes 141 on the tray 14 to be placed on the frame 13 (FIG. 2B). First recesses 132 are provided at the four corners of the upper surface of the frame 13, and first projections 143 are provided at the four corners of the lower surface of the tray 14 in positions corresponding to the first recesses 132. By fitting the first projections 143 of the tray 14 into the first recesses 132 of the frame 13, the tray 14 is placed on a predetermined position of the frame 13. Similarly, second projections 133 and second recesses 121 are provided at the four corners of the lower surface of the frame 13 and at the four corners of the upper surface of the lift 12, respectively (FIG. 3A). By fitting the second projections 133 into the second recesses 121, the frame 13 is placed on a predetermined position on the lift 12.

Next, the application process procedure using the applicator for grain boundary diffusion process according to the present embodiment will be described with reference to FIGS. 3A through 3E.

First, a sintered compact S is placed in each of the holes 141 on the tray 14. After the supporter 15 is laid on top of the tray 14, the tray 14 is fixed onto the frame 13. Then, the second projections 133 of the frame 13 are fitted into the second recesses 121 of the lift 12 to fix the frame 13 onto the lift 12 (FIG. 3A). After that, the magnetic clamp 16 is moved upward and the sintered compacts S are held by a magnetic attraction.

Figure 3C:
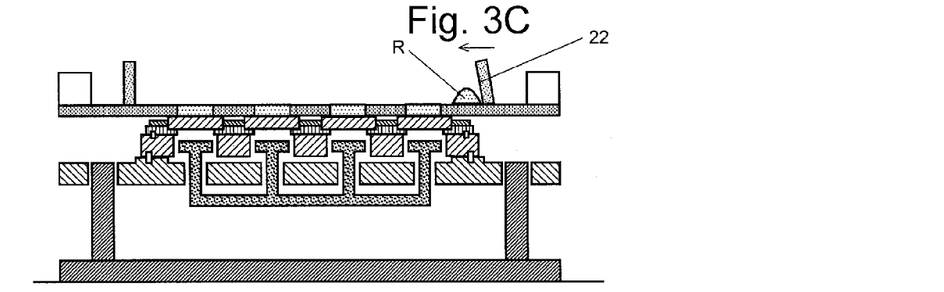
Figure 3D:
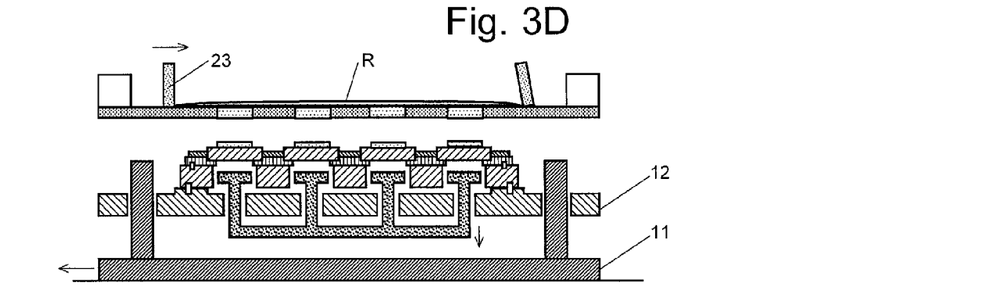

Subsequently, the base 11 is moved to the position immediately below the print head 20 (FIG. 3B), and the lift 12 is moved upward until the upper surface of the sintered compact S reaches almost the position of the lower surface of the screen 21 (FIG. 3C). Then, the coating material R is placed on the upper surface of the screen 21, and the squeegee 22 is moved while in contact with the upper surface of the screen 21 (FIG. 3C). As a result, the coating material R is applied to the upper surface of the sintered compact S by being passed through the passage section 211 of the screen 21.

After the coating material R has been applied to the upper surface of the sintered compacts S, while the lift 12 is moved downward, the coating material R is dispersed across the whole upper surface of the screen 21 by sliding the backward scraper 23 slightly above the upper surface in preparation for the next application process. The coating material R remaining on the upper surface of the screen 21 is collected (FIG. 3D) at the end of the entire application process. Since the collected coating material R contains an expensive $R_H$, reusing the coating material R can decrease the cost.

Figure 3E:
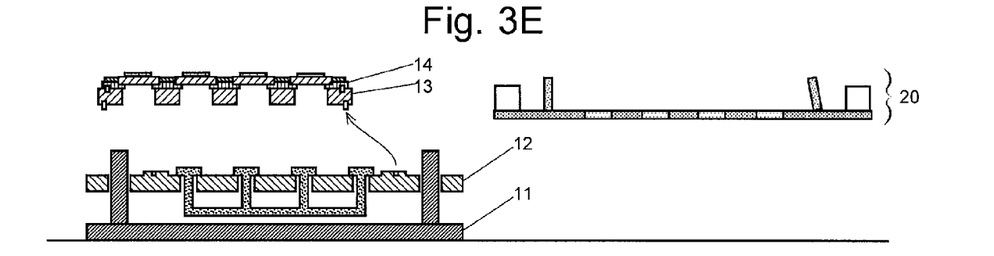

After the lift 12 is moved downward, the base 11 is moved so as to be away from the print head 20, and the magnetic clamp 16 is moved downward (FIG. 3E). If the coating material R is to be applied onto the other side of the sintered compacts S subsequent to this process, the sintered compacts S are placed on the tray 14 with that side facing upward, and the process described so far is performed again. The coating material R may also be applied to only one surface, depending on the use of the NdFeB system sintered magnet.

After the application of the coating material R to the sintered compacts S is finished, the sintered compacts S are heated in a heating oven. This makes the $R_H$ in the coating material diffuse inside the sintered compacts S through the grain boundary in the sintered compacts S. Consequently, a NdFeB system sintered magnet having a high coercive force can be obtained.

Figure 4A:
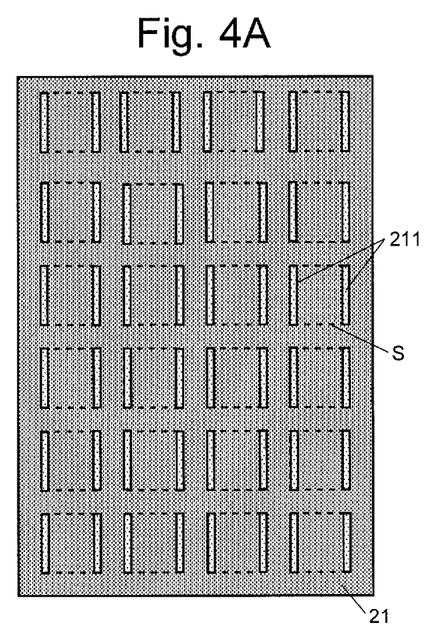
FIGS. 4A through 4D show examples of the screen, which is a part of the applicator for grain boundary diffusion process of the present embodiment.

The pattern of the passage section 211 may be those shown in FIGS. 4A through 4D. For example, if the screen 21 shown in FIG. 4A is used, the pattern of the coating material R applied onto a sintered compact S will be as shown in FIG. 5A. FIG. 5A shows an example in which the coating material R has been applied to two facing ends of a sintered compact S. For example, when a permanent magnet is used for a rotating machine such as a motor, at the beginning of rotation, a magnetic field is applied to the front end, with respect to the moving direction, of the magnet, where the orientation of the magnetic field is opposite to that of the magnetization of the front end. Therefore, the permanent magnet is likely to be demagnetized, leading to power reduction over time. Hence, increasing the coercive force of the end portion when manufacturing a NdFeB system sintered magnet makes it more effective for such uses.

Figure 4B:
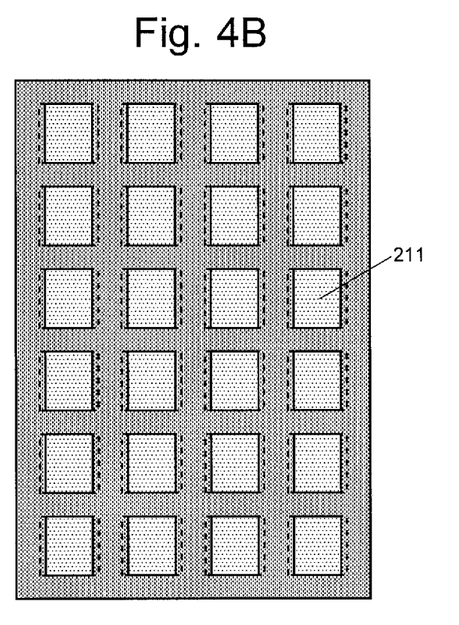
Figure 4C:
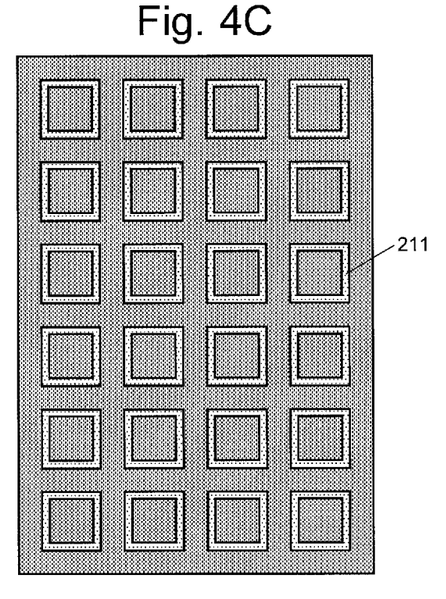
Figure 4D:
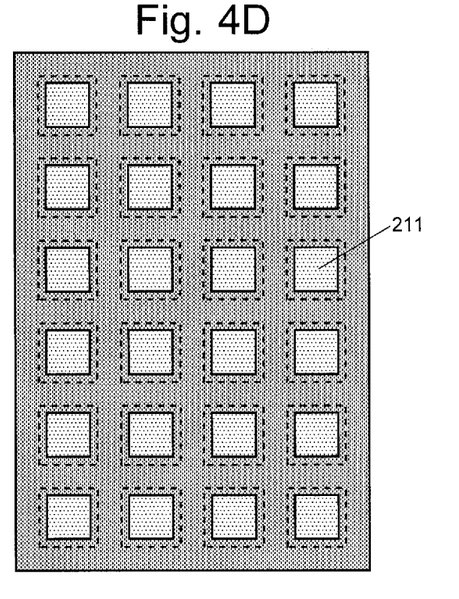
Figure 5A:
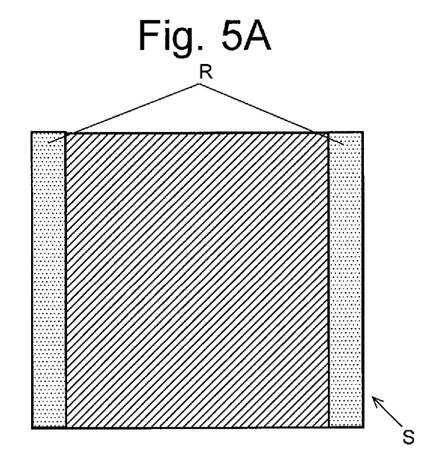
FIGS. 5A through 5F show examples of the pattern of the coating material to be applied to the surface of a sintered compact of a NdFeB system alloy powder in the present embodiment.
Figure 5B:
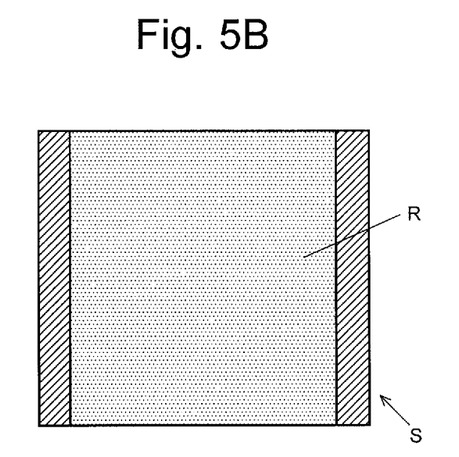
Figure 5C:
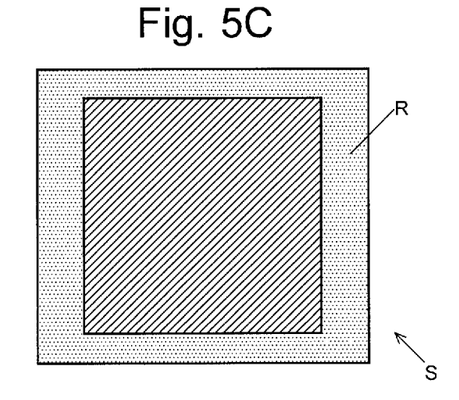
Figure 5D:
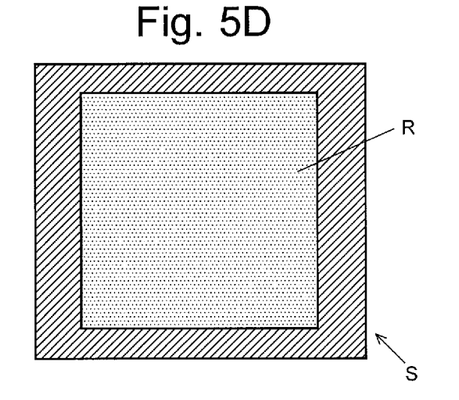

The screens 21 of FIGS. 4B, 4C, and 4D correspond to the application patterns shown in FIGS. 5B, 5C, and 5D, respectively. As just described, with the applicator of the present invention, it is possible to easily and uniformly apply the coating material R on the sintered compact S with a variety of patterns by simply changing the screen 21 to that of a different passage section 211, depending on the use of the magnet. Naturally, the coating material R can be applied to the whole surface of the sintered compact S. Even if the application (printing) surface of the sintered compact S is not flat, the applicator can be easily modified by making a screen corresponding to the shape of the application surface.

Figure 5E:
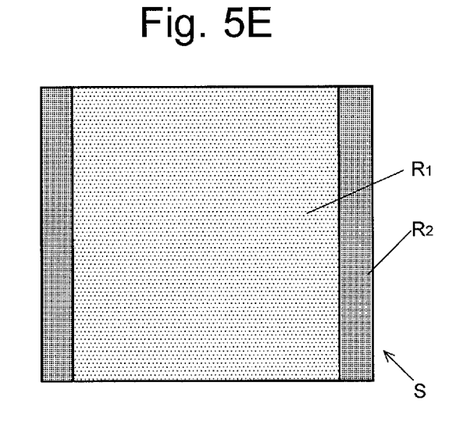
Figure 5F:
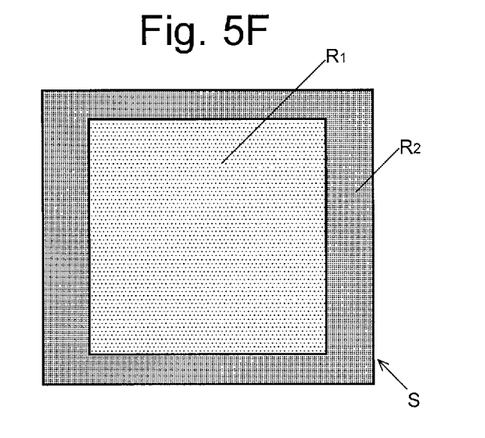

Using the screens of FIGS. 4A and 4B one by one makes it possible to apply coating materials $R_1$ and $R_2$, which have different components, proportions, and other factors, on different areas of a sintered compact S as shown in FIG. 5E. As previously described, it is necessary to increase the coercive force especially at the edge portion of a magnet in a motor or the like. In this case, the coating material $R_2$ that is applied to the edge portion may contain Tb, which significantly increases the coercive force, while the coating material $R_1$ that is applied to the center portion may contain Dy, which is less expensive than Tb. This can increase the overall coercive force, while suppressing the cost as much as possible. The content of Tb or Dy may be changed within each area. In the same manner, the coating materials can be applied in the pattern shown in FIG. 5F by combining the screens of FIGS. 4C and 4D.

Figure 6:
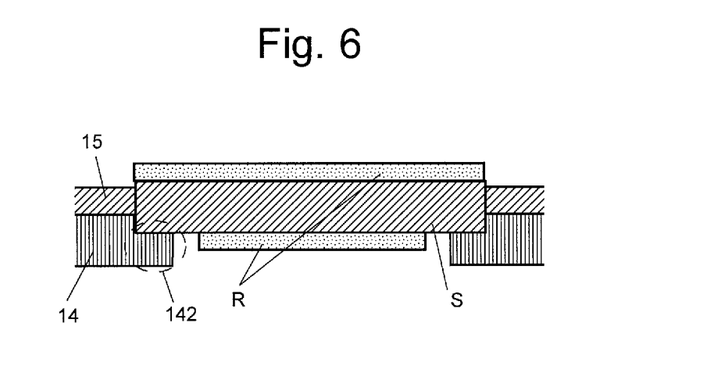
FIG. 6 is a vertical sectional view showing a pattern of the coating material to be applied to the two main surfaces of a sintered compact of a NdFeB system alloy powder in the present embodiment.

When a coating material R is applied to two opposite main surfaces (i.e. the surfaces with the largest area) of a sintered compact 5, the coating material R may be stuck on the tray 14. In order to avoid this, after the coating material R is first applied to one surface as shown in FIG. 5B by using the screen of FIG. 4B, for example, the sintered compact S is turned over. Then, the portion to which the coating material R has not been applied as shown in FIG. 5B is attached to the holding unit 142 of the tray 14 and the coating material R is applied to the other main surface (FIG. 6). This allows it to be heated for the grain boundary diffusion while the sintered compact S is left on the tray 14, increasing the operability when making a NdFeB system sintered magnet.

Figure 7:
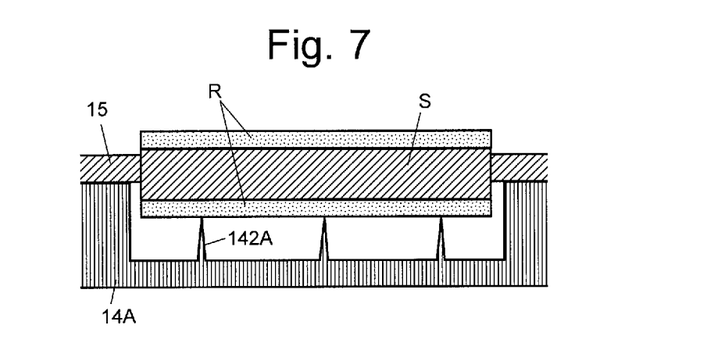
FIG. 7 is a vertical sectional view showing a modification example of the tray on which a sintered compact is placed.

In the case where the coating material R is to be applied to the whole area of each main surface, a sintered compact S may be held with a pointy holding unit 142A as shown in FIG. 7, for example. This decreases the contact area between the application surface of the sintered compact S and the tray 14A, which reduces waste due to the coating material R being stuck on the tray 14A. In addition, after the coating material R has been applied to both surfaces, a heating operation can be performed while the sintered compact S is placed on the tray 14A.

EXPLANATION OF NUMERALS

10 . . . Work Loader
11 . . . Base
12 . . . Lift
121 . . . Second Recess
13 . . . Frame
131 . . . Opening
132 . . . First Recess
133 . . . Second Projection
14, 14A . . . Tray
141 . . . Hole
142, 142A . . . Holding Unit
143 . . . First Projection
15 . . . Supporter
16 . . . Magnetic Clamp
20 . . . Print Head
21 . . . Screen
211 . . . Passage Section
22 . . . Squeegee
23 . . . Backward Scraper
R, $R_1$, $R_2$ . . . Coating Material
S . . . Sintered Compact

The invention claimed is:

1. A method for manufacturing a NdFeB system sintered magnet comprising the steps of:
placing a coating material, which is a slurry of a powder of $R_H$ or a slurry of a powder of a compound of $R_H$, on an upper surface of a screen in which a passage section which allows the coating material to pass therethrough is provided in a predetermined pattern, the $R_H$ being Dy and/or Tb;
making the coating material on the upper surface of the screen pass through the passage section by a coating material supplier, thereby printing the coating material by applying the coating material to surfaces of multiple sintered compacts of a NdFeB system alloy powder fixed at predetermined positions by a jig; and
heating the multiple sintered compacts together with the coating material.

2. The method for manufacturing a NdFeB system sintered magnet according to claim 1, wherein the coating material is applied to two opposite main surfaces of the multiple sintered compacts, in such a way that an uncoated area to which the coating material is not applied is provided on one main surface, and the jig on which one of the multiple sintered compacts is placed comes in contact with only the uncoated area when the coating material is applied to the other main surface after the main surfaces are reversed.

3. The method for manufacturing a NdFeB system sintered magnet according to claim 1, wherein the multiple sintered compacts are held by a magnetic attraction of a magnet when the coating material is applied to the multiple sintered compacts.

4. The method for manufacturing a NdFeB system sintered magnet according to claim 1, wherein there are multiple kinds of coating materials, and each of the coating materials is applied to a different area on the surface of one of the multiple sintered compacts.

5. The method for manufacturing a NdFeB system sintered magnet according to claim 1, wherein the coating material supplier includes a squeegee.

6. The method for manufacturing a NdFeB system sintered magnet according to claim 1, wherein the coating material is applied to two opposite main surfaces of the multiple sintered compacts, in such a way that after the coating material is applied to one main surface, the main surfaces are reversed, and the coating material is applied to the other main surface.

7. The method for manufacturing a NdFeB system sintered magnet according to claim 6, wherein jig on which one of the multiple sintered compacts is placed holds the main surface of the one of the multiple sintered compacts with a pointy holding unit.

8. The method for manufacturing a NdFeB system sintered magnet according to claim 7, wherein the heating of the multiple sintered compacts is performed together with the jig.

* * * * *